United States Patent [19]
Kingston et al.

[11] Patent Number: 5,105,437
[45] Date of Patent: Apr. 14, 1992

[54] PROGRAMMABLE DIGITAL ACQUISITION AND TRACKING CONTROLLER

[75] Inventors: Samuel C. Kingston; Steven T. Barham, both of Salt Lake City; Harold L. Simonsen, West Valley City, all of Utah

[73] Assignee: Unisys Corporation, Blue Bell, Pa.

[21] Appl. No.: 559,013

[22] Filed: Jul. 26, 1990

[51] Int. Cl.[5] .............................................. H04L 27/30
[52] U.S. Cl. ....................................... 375/1; 375/115; 380/34; 380/48
[58] Field of Search ................... 375/1, 115; 380/48, 380/34; 370/18

[56] References Cited
U.S. PATENT DOCUMENTS 4,291,409  9/1981  Weinberg et al. ................. 371/1
4,561,089  12/1985  Rouse et al. ...................... 370/18

Primary Examiner—Bernarr E. Gregory
Attorney, Agent, or Firm—John B. Sowell; Mark T. Starr

[57] ABSTRACT

A novel programmable digital acquisition and tracking controller is coupled to the input signal level from the demodulator of a communications receiver and provides programmable signal level threshold detectors and detection intervals adapted to produce an output signal which is indicative of the correlation between the received PN code and the locally generated PN code as compared against a programmable threshold. The programmable detector logic is capable of detecting acquisition correlation and tracking correlation and can optionally inform an external microprocessor of the correlation level so as to implement a wide variety of acquisition, tracking and reacquisition algorithms as well as optional AM demodulation.

8 Claims, 3 Drawing Sheets

PROGRAMMABLE DIGITAL ACQUISITION AND TRACKING CONTROLLER

BACKGROUND OF THE INVENTION

1. Field of the Invention

The present invention is related to a novel acquisition and tracking controller for a communications receiver. More particularly, the present invention relates to a novel programmable acquisition and tracking controller for pseudo noise (PN) direct sequence spread spectrum modulated codes.

2. Description of the Prior Art

Heretofore, analog controllers used in communications receivers to acquire and track PN spread spectrum coded data were known. Such analog controllers measured the correlation of the received PN code and the PN code generated by the controller over a fixed detection time, and generated a voltage level indicative of the correlation of the two PN codes. Such analog controllers employed fixed algorithms for acquisition, tracking and reacquisition based on a comparison of the aforementioned voltage level with a threshold that was preset to a fixed value in such prior art devices.

Such analog receivers also included carrier frequency locking loops and phase locking loops as well as clock timing loops which were controlled by error signals produced by the receiver demodulation circuits and controlled by the output of the acquisition and tracking controllers.

Heretofore digital tracking loops for frequency phase and clock timing have been proposed. Such prior art proposed circuits were not programmable and flexible nor were they intended to be manufactured as a single system on one very large scale integrated circuit chip.

It would be highly desirable to provide a remotely programmable digital acquisition and tracking controller as part of a digital communications receiver suitable for implementation on one very large scale integrated circuit chip.

SUMMARY OF THE INVENTION

It is a primary object of the present invention to provide a novel programmable digital acquisition and tracking controller.

It is a primary object of the present invention to provide a remotely programmable controller suitable for variable dwell time sequential detection of PN codes or fixed dwell time detection of PN codes.

It is a primary object of the present invention to provide a digital controller having fast acting detection hardware logic with an interface to a higher level external microprocessor logic for programming the detection logic and implementing a wide variety of acquisition, tracking and reacquisition algorithms.

It is another object of the present invention to provide a novel controller having a threshold detector and detection interval which are programmable and thus can be optimized to achieve faster code acquisition than prior art devices.

It is another object of the present invention to provide a controller having two stages of programmable detection logic.

It is another object of the present invention to provide an acquisition and tracking controller which may be programmed to verify acquisition of a PN code or codes and immediately send a detect information signal to other parts of the receiver system without the requirement of intervention by the external microprocessor.

It is another object of the present invention to provide an acquisition and tracking controller which may halt the process of verification and call upon the higher level microprocessor logic to take action as deemed necessary by the external microprocessor to achieve a confirmable code acquisition.

It is another object of the present invention to provide an acquisition and tracking controller which may be programmed to inform the external microprocessor that correlation has been detected and allow the microprocessor to implement a wide variety of algorithms to verify code acquisition prior to sending a detect information signal to other parts of the receiver system.

It is another object of the present invention to provide an acquisition and tracking controller which will detect a loss of correlation while tracking and halt the process of attempting to track when proper tracking detection cannot be achieved after acquisition has been achieved.

It is an object of the present invention to continuously monitor the correlation between the received PN code and the locally generated PN code and inform the external microprocessor if the correlation level falls below a programmable threshold level.

It is an object of the present invention to automatically halt the monitoring of correlation levels after the loss of correlation is detected and to allow the external microprocessor to command a wide variety of reacquisition algorithms.

It is an object of the present invention to provide a correlation level as a measure of the input signal amplitude for use by the communications receiver system as an optimal amplitude modulation (AM) demodulator output.

According to these and other objects of the present invention, a programmable digital acquisition and tracking controller is provided with programmable fast acting correlation hardware, programmable thresholds and detection intervals and an interface to an external microprocessor for optimal implementation of a wide variety of PN code acquisition, tracking and reacquisition algorithms as well as AM demodulation.

DESCRIPTION OF THE PREFERRED EMBODIMENT

Figure 1:
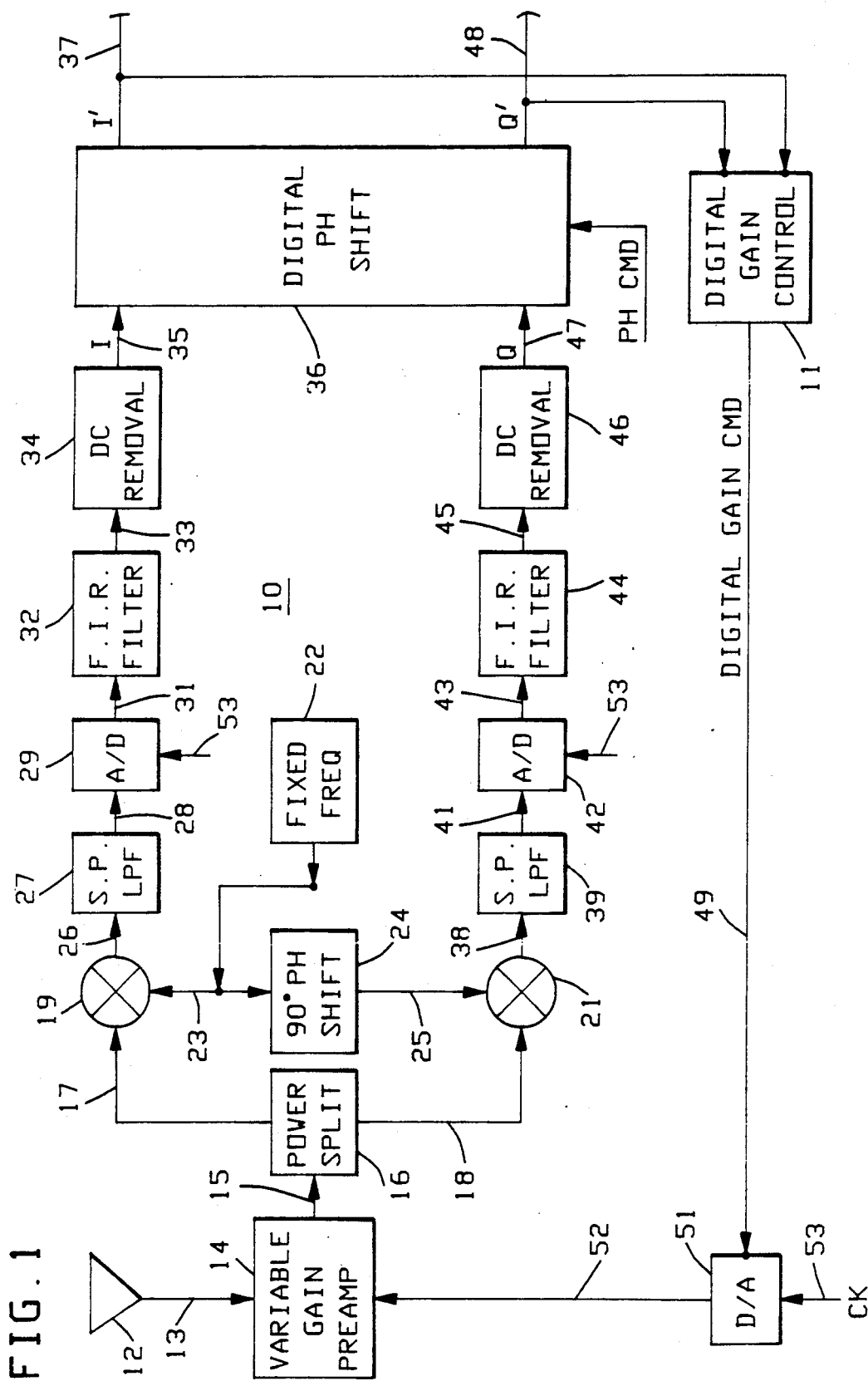
FIG. 1 is a schematic block diagram of a communications receiver pre-processing circuitry illustrating a preferred embodiment use of the present invention programmable digital acquisition and tracking controller.

Refer now to FIG. 1 showing the present invention programmable digital gain controller 11 connected to a data stream of a digital sample data communications receiver 10. The radio frequency signals received by the antenna 12 are coupled via line 13 as analog signals to a variable gain preamplifier 14 to provide a controlled level output signal on line 15 to power splitter 16. The RF analog signal on lines 17 and 18 are applied to a pair of mixers 19 and 21 connected to the real and imaginary channels I and Q respectively. A fixed frequency oscillator 22 has an output on line 23 which is connected to mixer 19 and to a 90° phase shifter 24 which provides a quadrature output on line 25 to mixer 21. The real analog RF signal on line 26 is applied to a single pole low pass filter 27 to provide a filtered analog output signal on line 28. The analog signal at the input of A to D converter 29 is converted to a digital output on line 31 which is applied to a finite impulse response (FIR) filter 32 to provide a filtered digital signal on line 33 which has some D.C. component that is removed by D.C. removal circuit 34 to provide the real digital signal on line 35. The real digital signal on line 35 is applied to a digital phase shifter 36 of the type set forth in my U.S. Pat. No. 4,841,552 to provide a phase shifted signal on line 37 shown as I'.

In a manner similar to that described above, the output signal on line 38 in the imaginary channel Q is applied to a low pass filter 39 whose output on line 41 is applied to an A to D converter 42. The digital output on line 43 is applied to a filter 44 and the filtered output on line 45 is applied to a D.C. removal circuit 46 to provide the imaginary digital signal Q on line 47. The imaginary signal Q on line 47 is applied to the digital phase shifter 36 of the type described in U.S. Pat. No. 4,841,552 to provide the phase shifted imaginary signal Q' on line 48. The real and imaginary signals on line 37 and 48 are connected to a preferred embodiment digital gain controller 11 to provide a digital gain command on line 49 which is shown connected to digital to analog converter 51. The analog output on line 52 is connected to the analog variable gain preamplifier 14 to control the output signal on line 15 at a predetermined controlled level. When the variable gain preamplifier is provided with a digital input, the digital gain command on line 49 may be coupled directly to the preamplifier 14 so as to eliminate the D to A converter 51. Clock strobe signals such as that shown on line 53 are applied to the digital blocks which occur after the A to D converters 29 and 42. The low pass filters 27 and 39 may be constructed as RC filter circuits and the FIR filters 32 and 44 may be constructed in the manner shown in my U.S. Pat. No. 4,808,939. It will be understood that all schematic blocks shown in the FIG. 1 embodiment need not be constructed according to my previously mentioned patents but may be constructed by other equivalent circuits known in the prior art.

Figure 2:
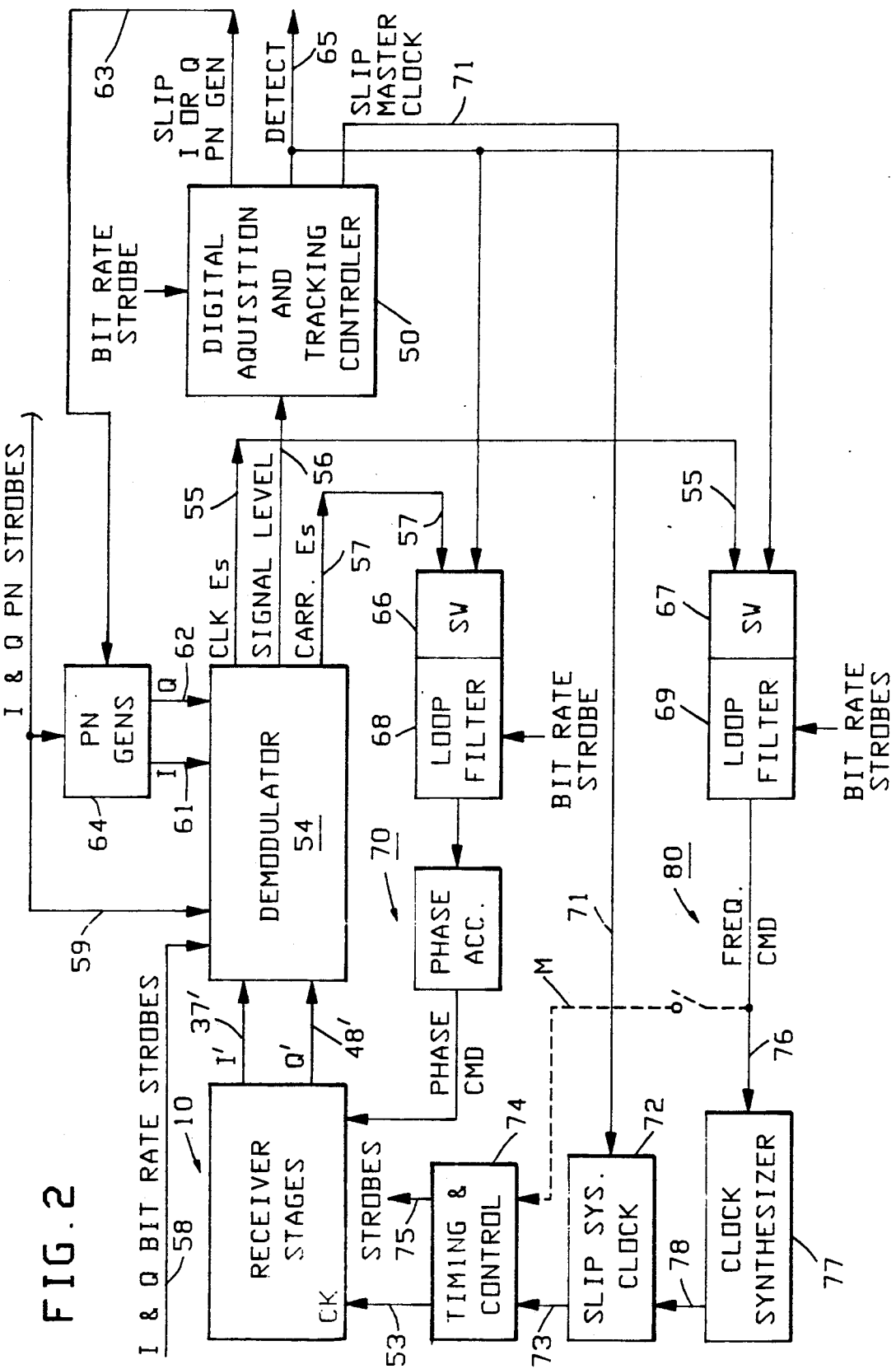
FIG. 2 is a schematic block diagram of a communications receiver showing the FIG. 1 pre-processing circuitry coupled to a demodulator and the present invention circuitry for controlling the tracking loop filters.

Refer now to FIG. 2 showing a schematic block diagram of a communications receiver which includes the FIG. 1 pre-processing circuitry coupled to a demodulator having output signals coupled to the present invention circuitry for controlling the three tracking loops at four control points. The FIG. 1 receiver 10 is shown having phase rotated outputs 37' and 48' applied as inputs to a demodulator 54. The demodulator 54 of the present invention may be a commercially available demodulator or the demodulator described in our co-pending U.S. application Ser. No. 07/559,012 filed Jul. 26, 1990 entitled SIX CHANNEL DIGITAL DEMODULATOR. The demodulator 54 is shown having a clock error signal output on line 55, a signal level output on line 56 and a carrier error signal $E_S$ output on line 57. Demodulator 54 is shown having strobe and timing input signals on lines 58 and 59 and PN code sequence inputs on line 61 and 62 to be described in greater detail hereinafter.

The signal level on line 56 is indicative of the signal level of the despread data and is applied to the present invention digital acquisition and tracking controller 50. Digital acquisition and tracking controller 50 produces digital control signals on line 63 which are capable of slipping the PN generators which provide the I and Q PN codes on line 61 and 62. The PN timing strobes on line 59 are employed to control the PN generator and to advance the PN generator to the next sequential output. The preferred method of generating the slip of the I or Q PN generator is to delete one of the I or Q PN strobes.

Digital acquisition and tracking controller 50 is adapted to produce a detection signal on output line 65 which indicates the original acquisition correlation and is applied to the switches 66 and 67 at the input of the loop filters 68 and 69 to close the carrier recovery loop 70 and code tracking loop 80.

During initial acquisition the control signal on output line 71 is employed to slip the master clock or system clock 72 which produces the system clock signal on line 73 applied to the timing and control circuits 74 shown producing the sampling clock signal input on line 53 which is applied to the numerous components of the receiver stages 10. The sampling clock or system clock is the base clock signal employed to drive the receiver stages 10, the demodulator 54 and the digital acquisition and tracking controller 50. A plurality of strobe signals from the timing and control circuit 74 are shown on line 75 and will be explained in greater detail hereinafter. The code timing loop 80 is shown producing a frequency command signal on line 76 which is applied to the clock synthesizer 77 which produces a system clock signal on output line 78. It will be understood that the clock synthesizer 77 may be a commercially available component or produced as one of the components on the integrated circuit of the digital receiver. Further, the block 72 indicating that the system clock is being slipped actually occurs at the output of the clock synthesizer circuit 77 and is preferably not a part of the integrated circuit.

In the preferred embodiment of the present invention, the function of slipping the system clock is accomplished by deleting a predetermined quantity of system clock time equivalent to one-half of the time interval between PN strobe times. Further, the I and Q PN strobe times may be different. In the preferred embodiment of the present invention during initial acquisition of the data on the I or Q channel it is preferred that the clock signal be slipped because it is a finer increment of PN time and once the digital acquisition and tracking controller indicates that acquisition correlation has been obtained the switches 66 and 67 in the carrier recovery loop and code timing loops are closed. The digital acquisition and tracking controller 50 then attempts to acquire the other I or Q data channel by slipping the PN generator with the signal previously explained on line 63. Once the I and Q data channels have been acquired the digital acquisition and tracking controller will shift into the tracking mode which does not employ the control signals on lines 63 and 71. Bypass circuit M shown in phantom lines may optionally be employed when the input signal is not sampled synchronous to the PN chip rate.

Figure 3:
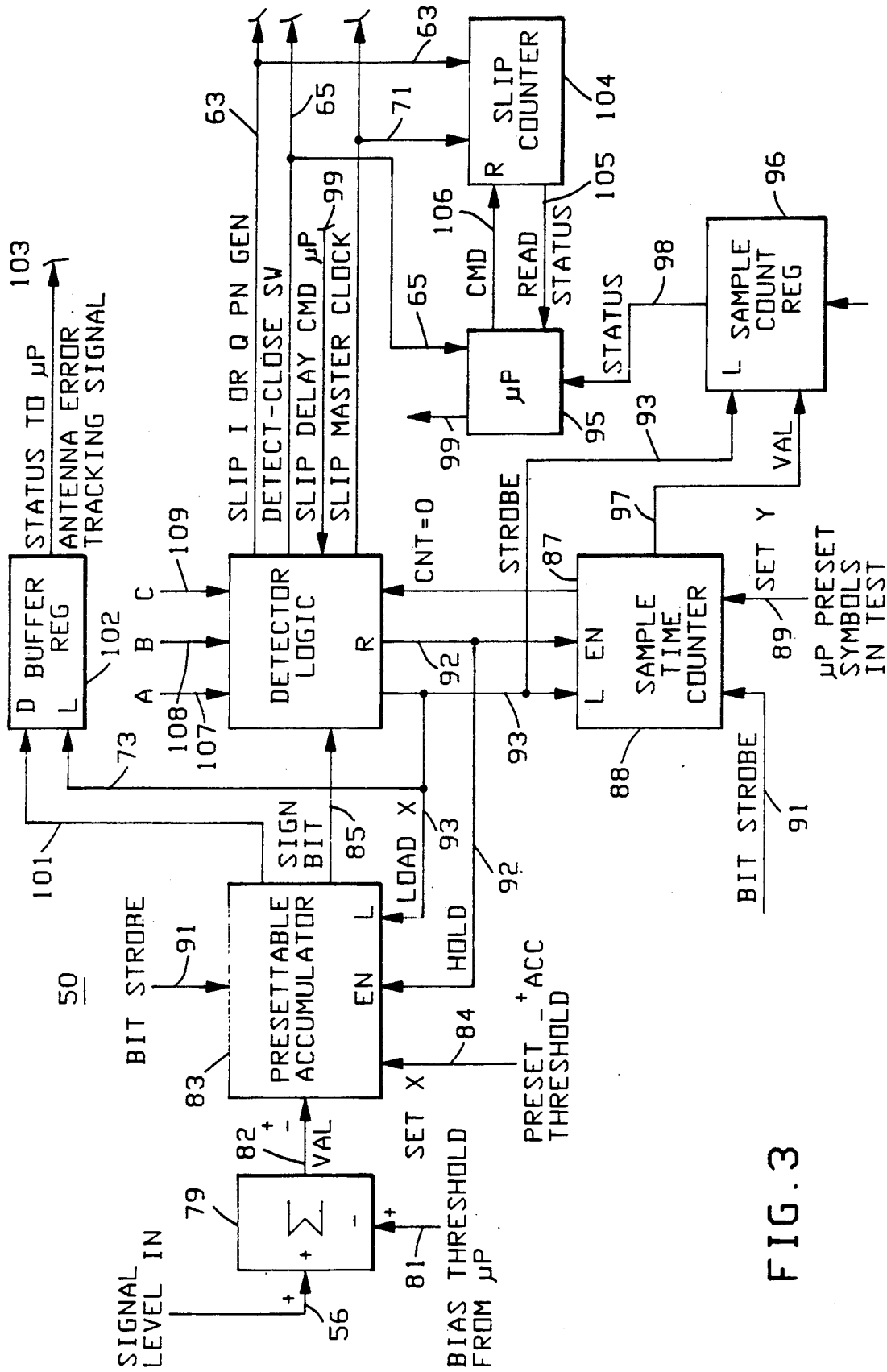
FIG. 3 is a detailed schematic block diagram of a preferred embodiment of the present invention programmable digital acquisition and tracking controller.

Refer now to FIG. 3 showing a more detailed schematic block diagram of the preferred embodiment of the present invention programmable digital acquisition and tracking controller 50 having the aforementioned signal level input 56 applied to a positive terminal of summing circuit 79 which has as a second input a programmable bias threshold input applied to the negative terminal via line 81. The output on line 82 is the difference between the positive bias applied to the negative input 81 and the signal level applied to the positive input 56. The output may be a positive or a negative value which is applied to the accumulator 83 shown having a preset input line 84 which is programmably preset from the microprocessor.

Summing circuit 79 and accumulator 83 comprise a programmable signal level threshold detector adapted to produce a single bit decision output on line 85. This single bit decision is actually just the sign bit of accumulator 83. The sign bit transition on line 85 is produced when the data on line 82 causes the value in the preset accumulator 83 to change sign. The transition sign bit on line 85 is applied to the detector logic 86. Logic 86 is also monitoring the count zero that appears on line 87 after a predetermined time period that has been set in the sample time counter 88 from the programmable microprocessor on line 89. The programmable count set on line 89 is not counted by the bit strobe on line 91 until enabled by the signal on line 92 from the detector logic 86. The enable signal on line 92 is applied as a hold enable signal to the accumulator 83 which is loaded by the reset signal produced on line 93 from the detector logic 86. The signal on line 93 loads the value X in the accumulator 83 at the same time the value Y is loaded into the sample time counter 88. The hold signal on line 92 is only used during the acquisition mode and will now be explained in greater detail.

First assume that the detector logic 86 has determined an acquisition correlation condition in which acquisition has not occurred and indicated by a negative sign bit on line 85 which occurs prior to the count equal zero on line 87. On the first occurrence of such non-acquisition correlation, a control signal is produced on line 71 also shown in FIG. 2 which causes the timing and control signals to slip the master or system clock. During the time that the controller 50 is waiting for the effect of the slipped master or system clock to feed back to the signal level 56, line 92 holds the accumulator 83 and the sample time counter 88 at their last values. After a predetermined amount of time set by the detector logic 86, the hold signal on line 92 is released to permit initialization of the values on lines 84 and 89 into the accumulator 83 and sample time counter 88. The detector logic 86 subsequently produces the load X signal and load signal on 93 to the accumulator 83 and counter 88 so that they are initialized to their preset values. In the preferred embodiment acquisition correlation mode, the presetable accumulator 83 and sample time counter 88 are reinitialized and the master or system clock slipped until the sign bit on line 85 remains positive at the time the count equals zero on line 87 indicating that initial acquisition correlation has occurred which causes the control signal on line 65 to raise a detect signal which closes the aforementioned switches 66 and 67 in the carry recovery loop 70 and code timing loop 80. The status or condition of the system is indicated to the microprocessor 95 via line 65. The microprocessor then reinitializes all of the programmable elements in the controller 50 and may start a new acquisition of a different data channel or enter the tracking mode. Assume that the first acquisition correlation was indicative of the PN signal on line 61 acquiring the I channel data on line 37' then the normal procedure would be to acquire the PN code on line 48' using the PN generator signal on line 62 and once this has occurred the controller 50 will enter the tracking mode which will be described hereinafter.

Assume now that the controller 50 has entered the tracking mode and the programmable inputs to the components of the controller have been preset by the microprocessor. Now the value on line 82 is expected to be positive, accordingly, the initial preset condition on line 84 is a negative value. If tracking correlation has been maintained, the sign bit on line 85 is now expected to go positive before the count equals zero on line 87 indicating that tracking mode is being maintained. The preset values in the threshold stages 79 and 83 are maintained and the detector logic 86 reinitializes a subsequent tracking verification by going through the whole process again looking for the positive sign bit on line 85 to occur before the count equals zero on line 87. The high speed lower level detector logic 86 can continue to monitor the tracking correlation independent of external microprocessor controls, however, should the sign bit on line 85 be low at the time the count equals zero on line 87, the detector logic 86 senses that tracking correlation has been lost and causes the control signal on line 65 to go low and informs the microprocessor 95 of its status via line 65 which now takes over as the detector logic 86 raises a hold signal on line 92. Now the microprocessor 95 can again reprogram the programmable elements of the controller 50 and either perform an acquisition mode operation or another track mode operation employed for verification. In the preferred embodiment of the present invention it is possible to employ a similar type of verification during acquisition without allowing any slip of the master clock or the PN generators. Another feature of the present invention is that the load or hold signal on line 93 is applied as a strobe load signal to the sample count register 96 which loads or reads the value of the sample in the down counter 88 at the time the hold signal occurs. This value on line 97 is held in the register 96 and provides a status to the microprocessor 95 via line 98 that is useful for the microprocessor to determine if the bias and preset thresholds on lines 81 and 84 need to be changed. It will be understood that the time counter 88 is used for both acquisition and tracking correlation but the microprocessor status line 98 is only used during acquisition correlation. The previously mentioned hold time on line 92 may be changed or reprogrammed by the microprocessor 95 via line 99.

Another feature of the present invention is that the controller 50 is capable of producing a signal indicative of low frequency AM modulation on the signal level at line 56. By taking the value in the accumulator 83 via line 101 and applying it to the data input of a buffer register 102 which is loaded during the tracking mode by line 93. The loaded value may be read via line 103 to the microprocessor and used by the microprocessor to generate an antenna error tracking signal.

During acquisition each time the master or system clock or the PN generator is slipped the signals on lines 71 and 63 increment a slip counter 104 which count is applied via line 105 to the microprocessor 95 as a status symbol. The slip counter 104 may be reset by a microprocessor command on line 106 which initializes the slip counter to zero with a reset input. The status signal on line 103 is used for several conditions, the most important being that detection of an excessive slip count after a predetermined period is indicative of having searched the entire PN code without achieving acquisition correlation. Thus, the status conditions monitored by the microprocessor permits the microprocessor to make decisions to modify the programmable parameter of the entire communications receiver as well as the programmable controller 50. Three of the direct programmable inputs to the detector logic 86 from the microprocessor 95 are shown as conditions A, B and C from the microprocessor on lines 107, 108 and 109 respectively. The control signal on line 107 is used to initialize acquisition or tracking. The control signal on line 108 is employed to set the detector logic 86 to the acquisition or tracking mode. The control signal on line 109 is employed to enable either the slip control signals on line 63 or 71 which slip the IPN generator, or the QPN generator, or the master system clock.

Having explained a preferred embodiment programmable digital acquisition and tracking controller it will be appreciated that the detector logic 86 is lower level hardware that is a fast acting controller and that the higher level microprocessor 95 is slower but is more flexible and is software programmable. The externally programmable microprocessor 95 may be easily adapted to numerous acquisition and tracking requirements without any hardware change. For example, the condition indicative of acquisition correlation or tracking correlation may be verified through a confidence algorithm stored in the microprocessor 95. Further, the microprocessor may be employed as a higher level monitor which is capable of reprogramming the controller 50 to achieve optimum conditions throughout the controller 50. Another feature of the present invention is that the higher level microprocessor 95 upon receiving a condition indicative a loss of tracking by a low signal on line 65 may make more than one decision as to which remedial measure will be taken. Thus, the novel controller 50 is capable of reprogramming itself if acquisition and/or tracking correlation is not achieved.

What is claimed is:

1. A programmable digital acquisition and tracking controller for a PN communications receiver, comprising:
    summing means having programmable threshold inputs and a signal level input indicative of correlation of two PN codes,
    programmable accumulator means coupled to the output of said summing means for generating signals indicative of an average correlation value of said two PN codes within a programmable time period,
    programmable detector logic means coupled to the output of said programmable accumulator means and having a correlation detection signal output and a plurality of control signal outputs,
    programmable time counter means having a programmable input for producing a count output which is coupled to said detector logic means for presetting a value indicating the end of said programmable time period, and
    said output of said programmable detector logic circuit means being adapted to close a plurality of tracking loops in said communications receiver upon detection of correlation of said two PN codes and to initiate said control signals to maintain tracking.

2. A programmable digital controller as set forth in claim 1 which further includes buffer register means coupled to the output of said programmable accumulator means for monitoring said average correlation value of said accumulator and producing an output status indicative of the tracking signal level.

3. A programmable digital controller as set forth in claim 2 wherein said detector logic circuit means is coupled to said buffer register means for loading said buffer register at the end of said programmable time period or earlier if the output of said programmable accumulator indicates tracking has been achieved.

4. A programmable digital controller as set forth in claim 2 wherein the output of said buffer register means is coupled to a remote microprocessor to provide status information for said microprocessor to make higher level command decisions.

5. A programmable digital controller as set forth in claim 1 which further includes a programmable sample count register coupled to said programmable time counter means for indicating average correlation signal values during acquisition prior to tracking.

6. A programmable digital controller as set forth in claim 5 wherein the output of said sample count register is coupled to a remote microprocessor to provide status information for said microprocessor to make higher level command decisions.

7. A programmable digital controller as set forth in claim 1 which further includes a slip counter coupled to the output control signals from said detection logic circuit means for indicating the number of times the generated PN code has been slipped during an acquisition cycle.

8. A programmable digital controller as set forth in claim 7 wherein the output of said slip counter is coupled to a remote microprocessor to provide status information for said microprocessor to make higher level command decisions.

* * * * *